(12) United States Patent
Kolter et al.

(10) Patent No.: US 11,222,651 B2
(45) Date of Patent: Jan. 11, 2022

(54) AUTOMATIC SPEECH RECOGNITION SYSTEM ADDRESSING PERCEPTUAL-BASED ADVERSARIAL AUDIO ATTACKS

(71) Applicant: Robert Bosch GmbH, Stuttgart (DE)

(72) Inventors: Jeremy Kolter, Pittsburgh, PA (US); Joseph Szurley, Upper Saint Clair, PA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/897,673

(22) Filed: Jun. 10, 2020

(65) Prior Publication Data

US 2020/0395035 A1 Dec. 17, 2020

Related U.S. Application Data

(60) Provisional application No. 62/861,965, filed on Jun. 14, 2019.

(51) Int. Cl.

| | | |
|---|---|---|
| *G10L 19/018* | (2013.01) | |
| *G10L 25/18* | (2013.01) | |
| *G10L 15/10* | (2006.01) | |
| *G10L 15/12* | (2006.01) | |
| *G10L 25/45* | (2013.01) | |

(52) U.S. Cl.
CPC ............. *G10L 25/18* (2013.01); *G10L 15/10* (2013.01); *G10L 15/12* (2013.01); *G10L 25/45* (2013.01); *G10L 19/018* (2013.01)

(58) Field of Classification Search
CPC .................................................. G10L 19/018
See application file for complete search history.

(56) References Cited

U.S. PATENT DOCUMENTS

| | | | |
|---|---|---|---|
| 10,043,527 B1 | 8/2018 | Gurijala et al. | |
| 2008/0215333 A1* | 9/2008 | Tewfik ................... | G10L 19/02 704/273 |
| 2014/0108020 A1 | 4/2014 | Sharma et al. | |

OTHER PUBLICATIONS

Lea Schonherr, "Adversarial Attacks Against Automatic Speech Recognition Systems via Psychoacoustic Hiding," 2018. (Year: 2018).*
Schonherr, et al., "Adversarial Attacks Against Automatic Speech Recognition Systems via Psychoacoustic Hiding," arXiv, 2018. (Year: 2018).*

(Continued)

*Primary Examiner* — Feng-Tzer Tzeng
(74) *Attorney, Agent, or Firm* — Brooks Kushman P.C.

(57) ABSTRACT

A computer-implemented method for creating a combined audio signal in a speech recognition system, the method includes sampling the audio input signal to generate a time-domain sampled input signal, then converting the time-domain sampled input signal to a frequency-domain input signal, afterwards generating perceptual weights in response to frequency components of critical bands of the frequency-domain input signal, creating a time-domain adversary signal in response to the perceptual weights; and combining the time-domain adversary signal with the audio input signal to create a combined audio signal, wherein a speech processing of the combined audio signal will output a different result from speech processing of the audio input signal.

19 Claims, 11 Drawing Sheets

(56) References Cited

OTHER PUBLICATIONS

Szurley et al., "Perceptual Based Adversarial Audio Attacks", Cornell University Library, New York, Jun. 14, 2019, 10 pages.
Schoenherr et al., "Adversarial Attacks Against Automatic Speech Recognition Systems via Psychoacoustic Hiding", Cornell University Library, New York, Aug. 16, 2018, 18 pages.
Qin et al., "Imperceptible, Robust, and Targeted Adversarial Examples for Automatic Speech Recognition.", arXiv e-prints, pagearXiv: 1903.10346, Mar. 2019, 13 pages.
Carlini et al., "Hidden Voice Commands", 25th USENIX Security Symposium (USENIX Security 16), pp. 513-530, 2016, 19 pages.
Information technology—Coding of moving pictures and associated audio for digital storage media at up to about 1,5 Mbit/s—Part 3: Audio. Standard, International Organization for Standardization, Geneva, CH, 1993, 6 pages.

* cited by examiner

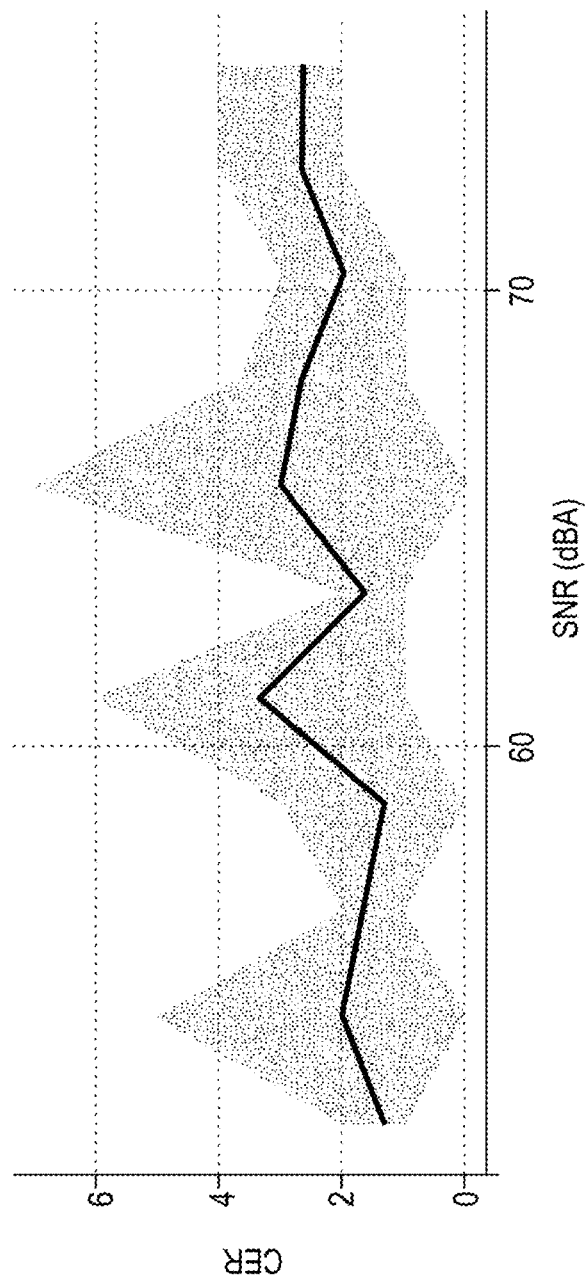

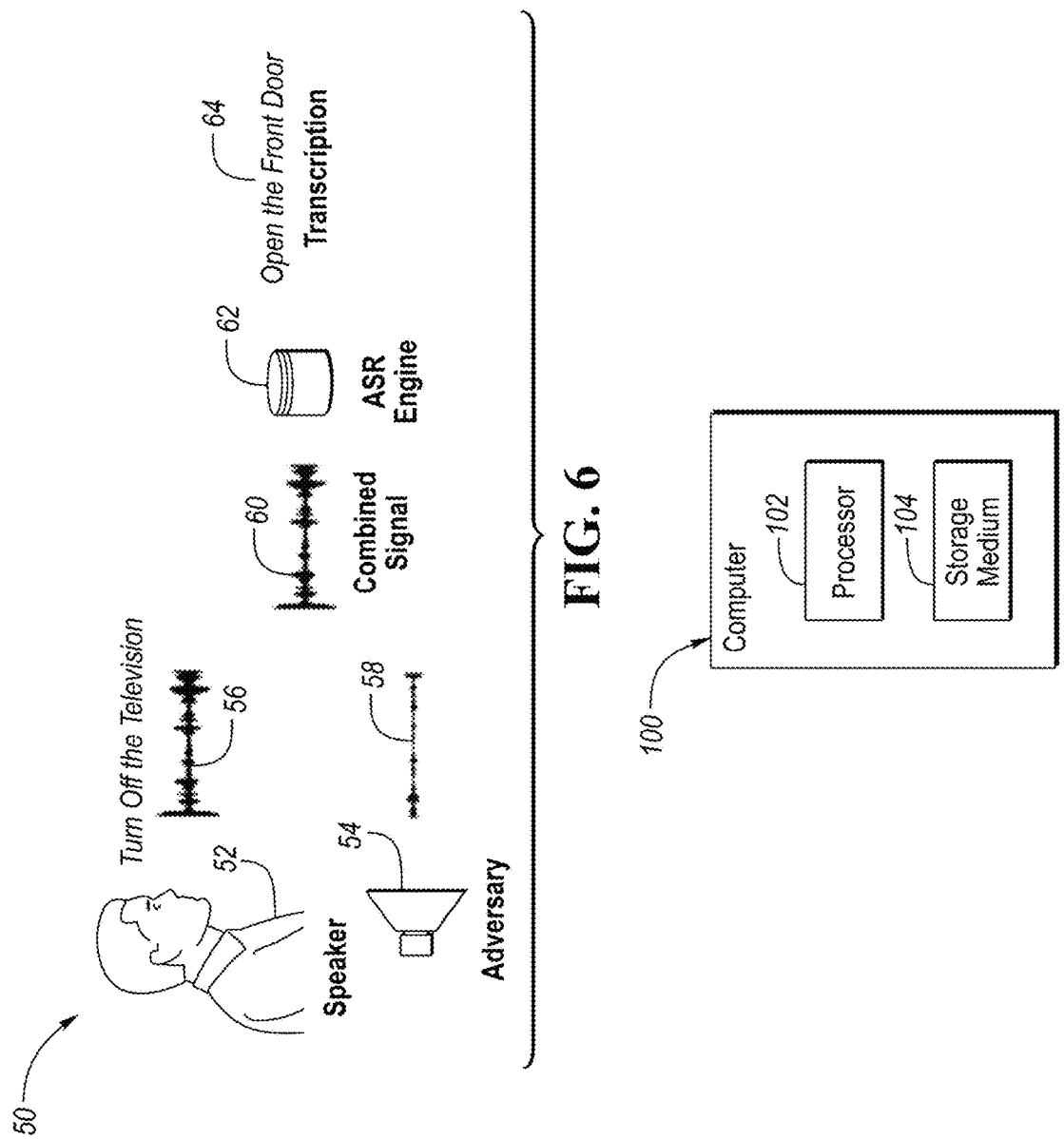

AUTOMATIC SPEECH RECOGNITION SYSTEM ADDRESSING PERCEPTUAL-BASED ADVERSARIAL AUDIO ATTACKS

CROSS-REFERENCE TO RELATED APPLICATIONS

This application claims the benefit of U.S. provisional application Ser. No. 62/861,965 filed Jun. 14, 2019, the disclosure of which is hereby incorporated in its entirety by reference herein.

TECHNICAL FIELD

This invention relates generally to an automatic speech recognition system (ASR) addressing perceptual based adversarial audio attacks by adding a relatively small, imperceptible amount of noise to the signal.

BACKGROUND

Automatic Speech Recognition (ASR) is a technology of the recognition and translation of spoken language into text by a computer system. The spoken language or speech is received via a microphone, or other input and processed to generate text associated with the speech. The text may be used as an input to a computer, computer system, or other system via this interface such that normal human conversation can be used to control the system.

Adversarial machine learning is a technique used in the field of machine learning that attempts to fool ASR models with malicious input. Adversarial machine learning can be applied to attack or to cause a malfunction in a machine learning model. However, adversarial machine learning can also have beneficial applications, such as increasing robustness of a machine learning model. These techniques may be used to manipulate input data so as to identify vulnerabilities of the learning algorithms, such as security measures of the machine learning system. Once these security vulnerabilities are known, they can be used to increase robustness of the machine learning system.

SUMMARY

A computer-implemented method for obtaining an adversarial signal associated with an audio input signal to a speech recognition system, the method includes sampling the audio input signal to generate a time-domain sampled input signal, then converting the time-domain sampled input signal to a frequency-domain input signal, afterwards generating perceptual weights based on frequency components of critical bands of the frequency-domain input signal, creating a time-domain adversary signal based on the perceptual weights; and combining the time-domain adversary signal with the audio input signal to create a combined audio signal, wherein speech processing of the combined audio signal will output a different result from speech processing of the audio input signal.

A non-transitory computer-readable medium tangibly embodying computer readable instructions for a software program, the software program being executable by a processor of a computing device to provide operations including sampling the audio input signal to generate a time-domain sampled input signal, converting the time-domain sampled input signal to a frequency-domain input signal, generating perceptual weights based on frequency components of critical bands of the frequency-domain input signal, creating a time-domain adversary signal based on the perceptual weights, and combining the time-domain adversary signal with the audio input signal to create a combined audio signal.

A computer system for performing adversarial audio attacks to a automated speech recognition system having a processor for executing computer-readable instructions and a memory for maintaining the computer-executable instructions, the computer-executable instructions when executed by the processor perform the following functions: sampling the audio input signal to generate a time-domain sampled input signal, converting the time-domain sampled input signal to a frequency-domain input signal, identifying the critical bands via a psychoacoustic model of the human ear, generating perceptual weights based on frequency components of the critical bands of the frequency-domain input signal, creating a time-domain adversary signal based on the perceptual weights, and combining the time-domain adversary signal with the audio input signal to create a combined audio signal.

BRIEF DESCRIPTION OF THE DRAWINGS

FIG. 3 is a graphical illustration of a Perceptual Evaluation of Speech Quality (PESQ) score in relation to a varying a.

FIG. 5D is a graphical illustration of a CER using a greedy decoder for over-the-air attacks.

FIG. 6 is an illustration of an audio adversarial attack environment illustrating a change in speech recognition output.

FIG. 7 is a schematic diagram of a computing platform that may be utilized to implement the ASR formulations and algorithms of one or more embodiments.

DETAILED DESCRIPTION

Figure 1:
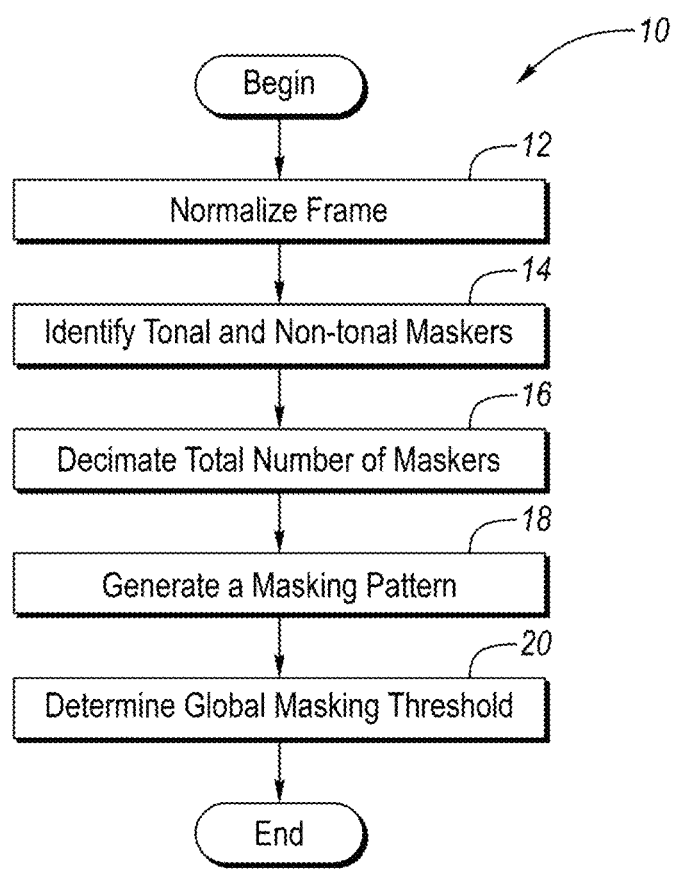
FIG. 1 depicts a flowchart of five (5) steps for calculating a global masking threshold according to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Adversarial audio attacks change an output of an automatic speech recognition system (ASR) by adding a small, imperceptible amount of noise to the signal. These attacks can be crafted using psychoacoustic properties.

Previous methods encountered instability during back-propagation in the frequency domain. These methods were not explored in the physical domain, i.e., they were conducted in a pure digital domain. Due to path effects from the speaker to the receiver, as well as additive noise, the success of the adversary may be severely affected in over-the-air scenarios.

Psychoacoustic-based attacks that do not have the aforementioned stability issues in the frequency domain are disclosed. The psychoacoustic-based attacks exploit the symmetry properties of the Discrete Fourier Transform (DFT) such that, once relevant perceptual measures are extracted from the original audio, the attack can be performed solely in the time domain. This reduces the memory requirements of the attack, compared to a frequency domain attacks, as there is no need to store both real and imaginary components. Further, the addition of generated room impulse responses creates robustness to the attacks for over-the-air conditions.

While machine learning algorithms have shown impressive performance on a variety of tasks in recent years, it has been shown that these algorithms can succumb to so-called adversarial attacks. These adversarial attacks have been applied to a variety of tasks including image, speech, and control domains. In adversarial attacks, a small perturbation (often imperceptible to a human observer) is added to the input signal with the goal of changing the output of the algorithm. This not only raises concerns over edge cases that may lead to unexplainable failures but also the security of systems that employ these algorithms.

With the ubiquity of personal voice assistants (e.g., Siri, Alexa, Google Home, etc.) which rely on automatic speech recognition (ASR) systems, it is a natural question to ask how robust these systems are to adversarial attacks. Typical adversaries for ASR systems are generated through targeted attacks which change the characters in the original utterance such that a target phrase is transcribed. While there are instances where a single character or word replacement may be adequate, for the majority of adversarial attacks on ASR systems, the entire phrase needs to be attacked. Furthermore, the adversarial attacks must be robust to perturbations so that they can be played over-the-air.

In the audio domain, the psychoacoustic properties of the human auditory system can be exploited to generate attacks that are more potent yet less perceptible. These rely on masking effects, where certain frequencies are less perceptible when presented simultaneously to the auditory system. Another benefit of relying on perceptual-based measures is that any non-speech audio in the environment can be utilized to inject noise into the signal, i.e., more noise allows for stronger attacks. For example, this technique has been utilized in an attack based on a music piece that contained an adversarial speech command.

Over-the-air attacks have been successfully implemented by incorporating transformations typically encountered by audio signals from a source to a receiver. However, such adversarial generation does not incorporate any psychoacoustic properties that may produce audible distortions to the signal. These psychoacoustic properties rely on back-propagation through the frequency domain and are not carried out in an over-the-air scenario. Furthermore, most previous adversarial audio scenarios rely on subjective human listening tests and metrics that do not explicitly account for the perceptual distortion of the adversarial signal, e.g., only the signal-to-noise ratio (SNR) difference is used.

The present disclosure provides a novel formulation of a psychoacoustic based attack for adversarial audio generation. This formulation exploits the psychoacoustic masking thresholds of the original signal and has an explicit trade-off between the audio distortion and strength of the adversary. The adversary can be generated completely in the time domain (once the psychoacoustic properties of the original phrase are converted from the frequency domain). The adversarial audio may be evaluated using the Perceptual Evaluation of Speech Quality (PESQ) score, which may eliminate the need for human listening tests. Finally, over-the-air tests was performed to highlight the robustness of the adversaries.

Typical deep learning-based ASR systems are end-to-end models which take raw speech segments and output a transcript. Since the processing of the audio signal is a multi-step process, attacks can target either the raw signal or the signal after it has been processed in a transform domain, e.g. after a Fast Fourier Transform (FFT) operation. To further increase the potency of the attacks, they can be applied in such a way to exploit properties of the signal in both the time and frequency domains.

Attacks are generated by manipulating the Mel-frequency cepstral coefficients (MFCC) and inverse transforming the coefficients back to the time domain. However, due to the lossy nature of the MFCC computation, some of the information of the original audio signal may be lost, limiting the attack space. The raw signal is attacked in a complete end-to-end fashion. These attacks focus on limiting the size of the adversary based on the signal-to-noise ratio (SNR) only and did not account for the perceptual distortion introduced by the adversary.

Further, in one or more embodiments, attacks are extended to incorporate typical transformations in the adversarial generation process that an audio signal encounters from source to receiver. This extension may improve the robustness of the attacks for over-the-air broadcasting but may be more perceptible to listeners. Psychoacoustic properties may be used to reduce the perceptibility of the adversarial signal. However, both methods may encounter instability during back-propagation in the frequency domain. These methods have not explored in the physical domain, i.e., they have been explored in the pure digital domain. Due to path effects from the speaker to the receiver, as well as additive noise, the success of the adversary may be severely affected in an over-the air scenario.

Here, a formulation for psychoacoustic based attacks addressing one or more of the above-identified stability issues in the frequency domain is presented. The formulation exploits the symmetry properties of the Discrete Fourier Transform (DFT) so that, once the relevant perceptual measures are extracted from the original audio, the attack can be performed solely in the time domain. This reduces the memory requirements of the attack, compared to a frequency domain formulation, as there is no need to store both real and imaginary components. We further add robustness to the attacks for over-the-air conditions by using generated room impulse responses.

For perceptual evaluation of the adversarial signals, the use of the Perceptual Evaluation of Speech Quality (PESQ) score (having a range from 0.5 (poor) to 4.5 (excellent)) is employed. The PESQ score is an objective measure to assess the speech quality of a system that induces a distortion on a reference speech signal in a completely automatic fashion, i.e., no listeners are necessary. It therefore helps characterize the quality of the speech signal as it would be perceived by a listener.

The generated attacks were shown to have high perceptual scores, i.e. low audible distortion, while still changing the transcription of the ASR system. The adversarial attacks are also shown to be robust when played over a speaker in mono (original audio and adversary on the same channel) and stereo (original audio and adversary on different channels) fashion.

Model Architecture

The use of a DeepSpeech model to generate adversarial audio examples is used in one or more embodiments. DeepSpeech is a speech-to-text multi-layer bi-directional model that uses a Connectionist Temporal Classification (CTC) loss. A raw audio waveform x is fed to the Deep-Speech model to produce a character level probability for each frame, which when decoded, produces an output phrase y. The CTC loss function is further able to score the most probable characters and phrases through different time alignments of x. The CTC is a fully differentiable function which can therefore be exploited to allow for adversarial generation on a per character level through each time instance over the entire length of x.

Adversarial Audio Generation

In adversarial audio attacks, a perturbation, $\delta$, is applied to the original raw waveform $\tilde{x}=x+\delta$ such that the output is now changed to target phrase $y_t$. This can be formulated as an optimization problem over $\delta$ of the form illustrated in equation (1) below $$\min_{\|\delta\|_2 \le \epsilon} L(x+\delta, y_{target}) \quad (1)$$

in which $L(\cdot)$ is the loss function and where $|\cdot|_2$ is an $l_2$-norm. This minimization problem is solved over the complete audio signal, again by exploiting the CTC loss function, ensuring that the $l_2$-norm of the adversary is inside some $\epsilon$-ball.

The adversary in equation (1) is only constrained to be inside an $\epsilon$-ball and is usually chosen in such a way as to minimally perturb the input. However, even if the attack is successful using this formulation, audible artifacts may still be perceptible. This is a result of the addition of certain frequency components, when considering the attack from the frequency domain, where the human auditory system has a varying sensitivity to intensity as a function of frequency. This sensitivity can be included in the optimization in equation (1) and furthermore exploited, to better mask the adversary.

Psychoacoustic Model

The sensitivity of a human auditory system is a function of both intensity, typically measured with a logarithmic sound pressure level (dB SPL), and frequency. It does not have a uniform response, requiring as little as −5 dB SPL (light leaf rustling) in the peak regime (2-5 kHz), and requires higher intensities, especially as the bounds of human hearing are approached ([20 Hz, 20 kHz]).

Due to this sensitivity and the discrete way in which sound is processed by the auditory system, a masking effect occurs around critical bands when multiple frequencies are presented simultaneously to a listener. The critical bands can be thought of as drowning out other frequencies in the neighborhood, which is again both a function of frequency and intensity, i.e., low intensities produce smaller masking effects. This masking can therefore be exploited to embed the adversarial signal under a certain hearing threshold thereby ensuring that it remains imperceptible.

Speech can be thought of as a dynamically changing process throughout the temporal domain. In order to get an accurate representation of the frequency components, analysis is normally carried out on short segments, or frames. Frame lengths are typically on the order of 10 to 20 ms for speech processing but may be larger or smaller, where it is assumed that the frequency components are stationary within this time frame. There is a small amount of overlap between frames, to ensure frequency continuity, and a window functioning is applied to smooth the transition of frequency components. Using this approach, the raw waveform x is segmented into N frames of length L given as set forth in equation (2) below $$x_n(kT)=x(kT+nL)w_L(t-nL) k \in [0,N-1] \quad (2)$$

in which n is the frame index and $w_L$ is a window function.

The psychoacoustic model used to find the global masking threshold was based on MPEG-ISO and was included in the attack. In one or more embodiments, the global masking threshold is generated via a five (5) step calculation. Calculating the global masking threshold per frame consists of the following five (5) steps. FIG. 1 depicts flowchart 10 of the five (5) steps for calculating a global masking threshold according to one embodiment.

$1^{st}$ Step

According to block 12 of flowchart 10, a frame is first normalized to a standard dB SPL which converts each frame to roughly the same intensity levels. While this is only an approximation of the dB SPL it is needed as signals have intensity levels that are functions of room dynamics, microphone responses and so forth. The signal is then windowed and transformed to the FFT domain to generate a power spectral density (PSD).

$2^{nd}$ Step

According to block 14 of flowchart 10, tonal and non-tonal maskers are then identified in the PSD. The tonal maskers represent exact frequency peaks in the PSD while the non-tonal maskers are found by a geometric mean across a group of frequencies. These maskers then help identify which frequencies become less perceptible when presented simultaneously.

$3^{rd}$ Step

According to block 16 of flowchart 10, the number of maskers is then reduced, or decimated, by comparing the tonal and non-tonal maskers using a sliding window scheme. This reduces the granularity of the maskers and results in a smoother transition between peaks in the PSD.

$4^{th}$ Step

According to block 18 of flowchart 10, the tonal and non-tonal maskers are then used to generate a masking pattern that encompasses the adjacent frequencies.

$5^{th}$ Step

According to block 20 of flowchart 10, the global masking threshold is the then determined by combining the masking patterns from the previous step. This global masking threshold then represents a perceptual weighting that is based on the intensity and frequency components of the signal as well as the psychoacoustic properties of the human auditory system.

The resulting global masking threshold t can then be found for each frame N across all frequencies $$f, t_n(f) \in \left[0, \frac{f_s}{2}\right],$$

in which f is the sampling frequency.

Figure 2:
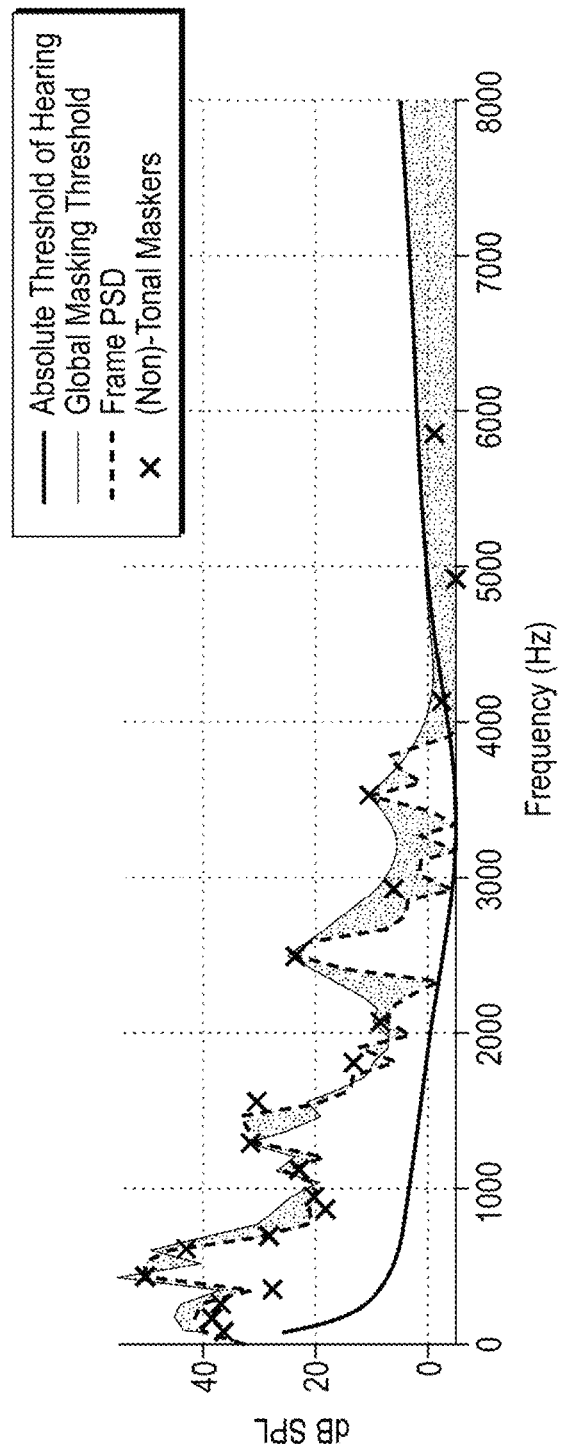
FIG. 2 is a graphical illustration of an absolute threshold of hearing in relation to a global masking threshold extracted from a speech frame.

FIG. 2 shows the absolute threshold of hearing (the minimal dB SPL for a sound to be perceived), the tonal and non-tonal maskers and the global masking threshold for a single analysis frame. The fill between the lines represents parts of the frequency band that will not be perceptible unless a higher dB SPL is reached, e.g., around 3 kHz there is a 10 dB SPL gap between the global masking threshold and the PSD of the analysis frame. The adversarial signal can therefore be added to this portion of the frequency spectrum, up to the masking threshold, while remaining inaudible.

Perceptual Based Audio Attack Optimization

Since the psychoacoustic model exploits the frequency domain relationship between the signal and the human auditory system, it is natural to first analyze how the attack can be formalized in the frequency domain. Relying on the linearity property of the Fourier transform, the adversary at frame n and frequency f can be represented as set forth in equation (3) below.

$$\tilde{X}_n(f) = X_n(f) + \delta_n(f) \quad (3)$$

The perceptual loss can be formulated as a weighting in the frequency domain between the original waveform and the adversarial waveform represented as set forth in equation (4) below.

$$L_{percep}(\delta) = \frac{1}{2N} \sum_{n=0}^{N-1} \sum_{f=0}^{\frac{f_s}{2}} w_n(f) |\delta_n(f)|^2 \quad (4)$$

in which $w_n(f)$ is a perceptual based weighting factor. This weighting factor is based on the global masking threshold derived in the Psychoacoustic Model as set forth in equation (5) below.

$$w_n(f) = 10^{-\beta t_n(f)} \quad (5)$$

in which $\beta$ is a compression factor that defines how much of the perceptual based weighting should be included and has been heuristically determined to lie in the range [0.04-0.06]. This can be thought of similarly to a power weighting between the original signal and the adversary.

The frequency based perceptual loss can now be reformulated in the time domain as set forth in equation (6) below:

$$L_{percep}(\delta) = \frac{1}{2N} \sum_{n=0}^{N-1} \delta_n^T D^H W_n D \delta_n \equiv \frac{1}{2N} \sum_{n=0}^{N-1} \delta_n^T G_n \delta_n \quad (6)$$

in which $(\bullet)^H$ represent the conjugate transpose of a matrix, D is the DFT matrix, and $W_n$ is a symmetric weighting matrix around $$\frac{f_s}{2}$$

defined as set forth in equation (7) below:

$$W_n = \begin{bmatrix} w_n(0) & 0 & \ldots & 0 \\ 0 & w_n(1) & \ldots & 0 \\ \vdots & \vdots & \vdots & \vdots \\ 0 & \ldots & w_n(1) & 0 \\ 0 & \ldots & 0 & w_n(0) \end{bmatrix} \quad (7)$$

For the ease of exposition, the multiplication of the weighting matrix and the DFT matrices are represented as $G_n = D^H W_n D$. Note that because of the symmetry properties of the DFT, the imaginary components are cancelled during the multiplication such that $G_n \in \mathbb{R}^{L \times L}$, where L is the DFT window length which is assumed to be equal to the frame length in equation (2).

The perceptual based loss in equation (6) and the adversarial loss in equation (1) can now be combined as represented in equation (8) below $$\min_{\|\delta\|_2 \leq \epsilon} \alpha L(x+\delta, y_{target}) + (1-\alpha) L_{percep}(\delta) \equiv \min_{\|\delta\|_2 \leq \epsilon} L_{tot}(x+\delta, y_{target}, \alpha) \quad (8)$$

in which $0 \leq \alpha \leq 1$ and $L_{tot}$ represents the total loss. While c constrains the overall size of the perturbation, a controls the amount of perceptual based penalty included in the optimization.

One of the benefits of using equation (8) is that the G matrices need only be computed once before optimizing the adversary as the original audio is not changed, i.e., the global masking threshold remains constant throughout the optimization procedure. This means that the adversarial signal does not need to be transformed to the frequency domain at each iteration. Compared to previous attacks that take place in the frequency domain, this approach reduces the memory needed, as real and complex components are no longer stored, and alleviates the previously mentioned stability problems in the optimization.

The use of $l_2$ norm constraint on $\delta$ in equation (8) allows for the attacks to be more localized in the audio signals. This is contrast to other adversarial audio attacks which use an $l_\infty$ allowing for equally large perturbations across the whole audio signal. Since the adversary is now constrained on the $l_2$-norm, it typically has larger values than that of an $l_\infty$ attack. Equation (8) may be solved using the projected gradient descent (PGD) method as set forth in equation (9) below.

$$\delta := P_\epsilon \left( \delta - \mu \frac{\nabla_{\delta} L_{tot}(x+\delta, y_t, \alpha)}{\|\nabla_{\delta} L_{tot}(x+\delta, y_t, \alpha)\|} \right) \quad (9)$$

in which $\mathcal{P}_\epsilon$ is the projection on the $\epsilon$ ball and $\mu$ is the step size. The projection of equation (9) may then be represented as set forth in equation (10) below.

$$P_z = \epsilon \frac{z}{\max\{\epsilon, \|z\|2\}} \quad (10)$$

Before the projection, we also include the constraint $-1 \leq x+\delta \leq 1$ to ensure that the adversarial signal lies within the valid normalized audio signal range. The normalization of the gradient in equation (9) also helps stabilize the descent direction.

Experimental Results

The DeepSpeech model was trained in pyTorch using the Librispeech dataset which consists of 960 hours of clean audio with corresponding transcriptions. During training, a sampling frequency of $f_s=16$ kHz was used and the data was augmented by adding random noise as well as pitch and time shifting the signal. The compression factor in equation (5) was $\beta=0.06$ for all experiments. The probabilities from the DeepSpeech model were decoded using a greedy method, i.e. at each instance, only the character with the highest probability is selected.

In order to assess the performance of the attack, we used several metrics that analyzed both the signal characteristics and final transcription. The word error rate (WER) is derived from the Levenshtein Distance algorithm and defines the minimum edit between two strings given as by equation (11) below:

$$WER = \frac{S+D+I}{N} \quad (11)$$

in which S is the number of substitutions, D is the number of deletions, I is the number of insertions, and $N=S+D+C$ where C is the number of correct words. For a perfect attack, $y=y_t$, $S=D=I=0$ thereby producing a WER=0. As the distance between the two string increases, $y \neq y_t$, i.e. more characters and words are changed, the WER likewise increases. The character error rate (CER) is the per-character difference between two strings and CER=0 when $y=y_t$. For perceptual evaluation we used the Perceptual Evaluation of Speech Quality (PESQ) score which has a range from 0.5 (poor) to 4.5 (excellent). The PESQ score was calculated in full reference mode, which is a sample-by-sample distortion comparison between x and x̃ after a temporal alignment. The output SNR was estimated using the original signal and $\delta$ as the noise signal.

Generated adversaries using the phrase "open the door" as $y_t$ with an $\varepsilon=1000$ had a 100% success rate (WER=CER=0) on 100 randomly sampled audio files from the Librispeech test set when no perceptual weighting was used ($\alpha=1$). The same randomly sampled files were attacked again, this time with $\alpha=0.8$ allowing for perceptual weighing to be included in the loss function. The perceptually weighted files again had a 100% success rate (WER=CER=0).

The SNR and PESQ scores were calculated for each signal using the perceptual ($\alpha=0.8$) and non-perceptual based ($\alpha=1$) attacks. In Table 1, it is shown that there is drop in the SNR and rise in PESQ score when using a perceptual based attack compared to that of a non-perceptual based attack. When no perceptual weighting is used, the attack can be equally spread anywhere on the frequency spectrum. This spreading in the frequency domain reduces the overall amplitude for any one frequency component which corresponds to a lower adversarial signal power and hence higher SNR. However, when the perceptual loss is included, the attack is focused more around frequencies that dominate the global masking threshold. This has the effect of increasing the power on some of the components, lowering the SNR, but ensuring that these lie within the masking threshold and are inaudible, raising the PESQ score.

TABLE 1

Comparison of Perceptual and non-Perceptual Based Attacks on the LibiriSpeech Test Set

| Perceptual Weighting ($\alpha$) | SNR (dB) | PESQ | WER | CER |
|---|---|---|---|---|
| 0 | 27.9 | 3.3 | 0 | 0 |
| 0.8 | 24.1 | 4.0 | 0 | 0 |

Figure 3:
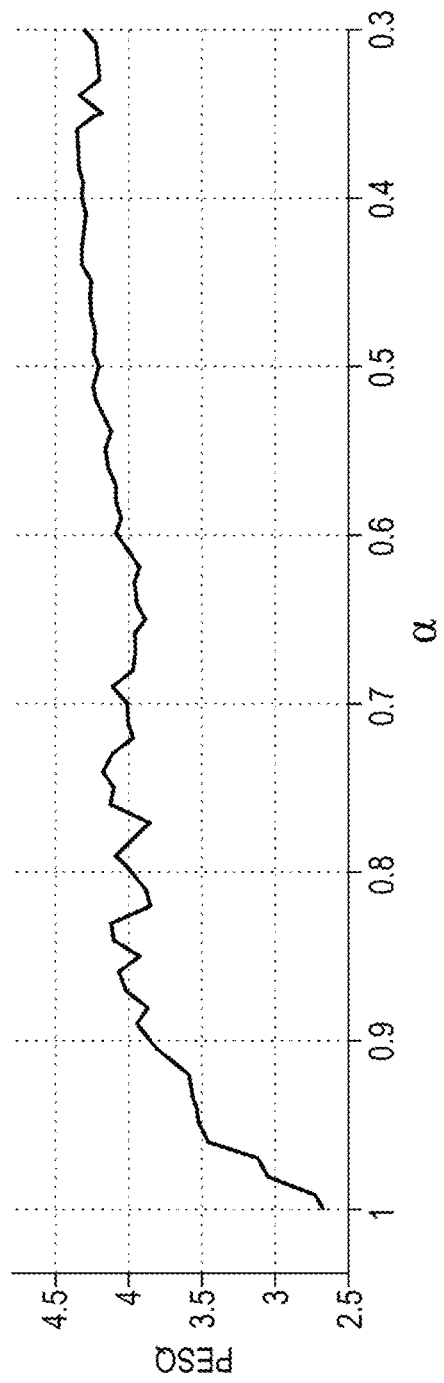

FIG. 3 illustrates the PESQ score as a is decreased which was stopped when the CER≠0 at $\alpha=0.3$. Surprisingly, the PESQ score rises rapidly with only a small decrease in a, indicating a rapid rise in the perceptual quality. With an $\alpha=0.4$, the PESQ score is almost at a maximal value of 4.5, so to a listener it would sound as if x=x̃. It was observed that the attack was not always successful with very low values of $\alpha$. This is most likely due to the adversary being heavily penalized for lying outside of the global masking threshold. This limits the overall bandwidth the attack can use and may prevent it from changing enough of the signal to generate a successful attack.

Figure 4A:
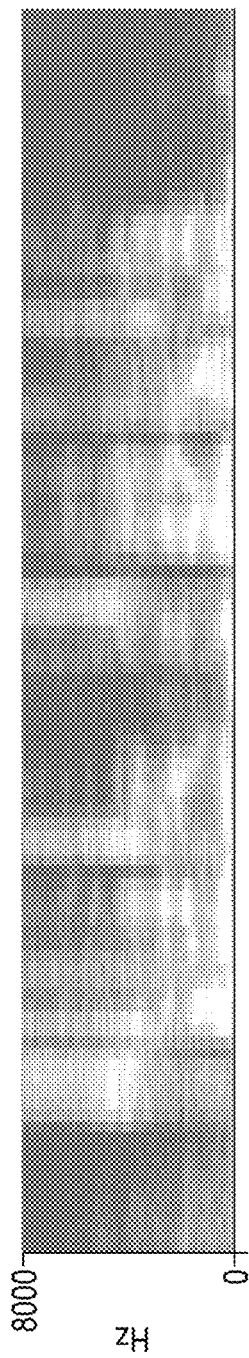
FIG. 4A is a spectrogram of a raw audio sample.
Figure 4B:
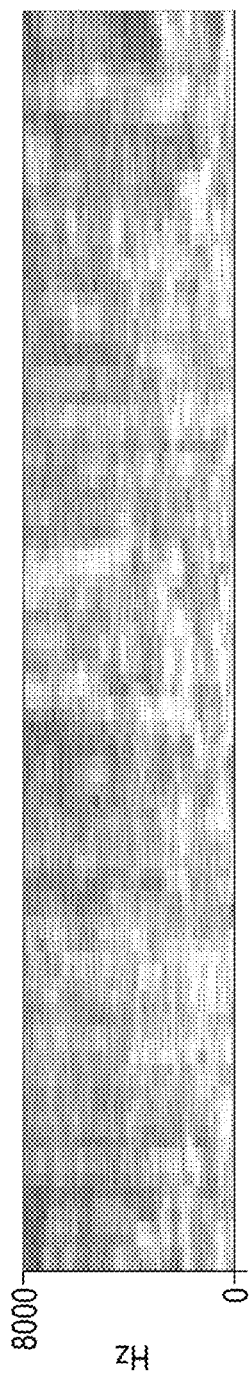
FIG. 4B is a spectrogram of the raw audio sample in which $\alpha=1$.
Figure 4C:
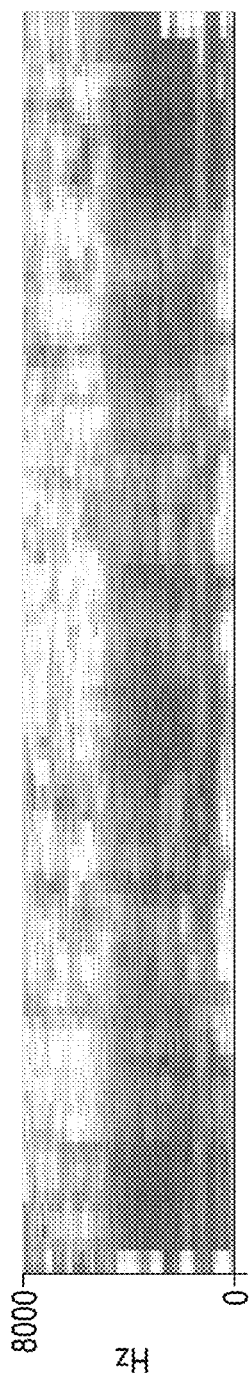
FIG. 4C is a spectrogram of the raw audio sample in which $\alpha=0.5$.
Figure 5A:
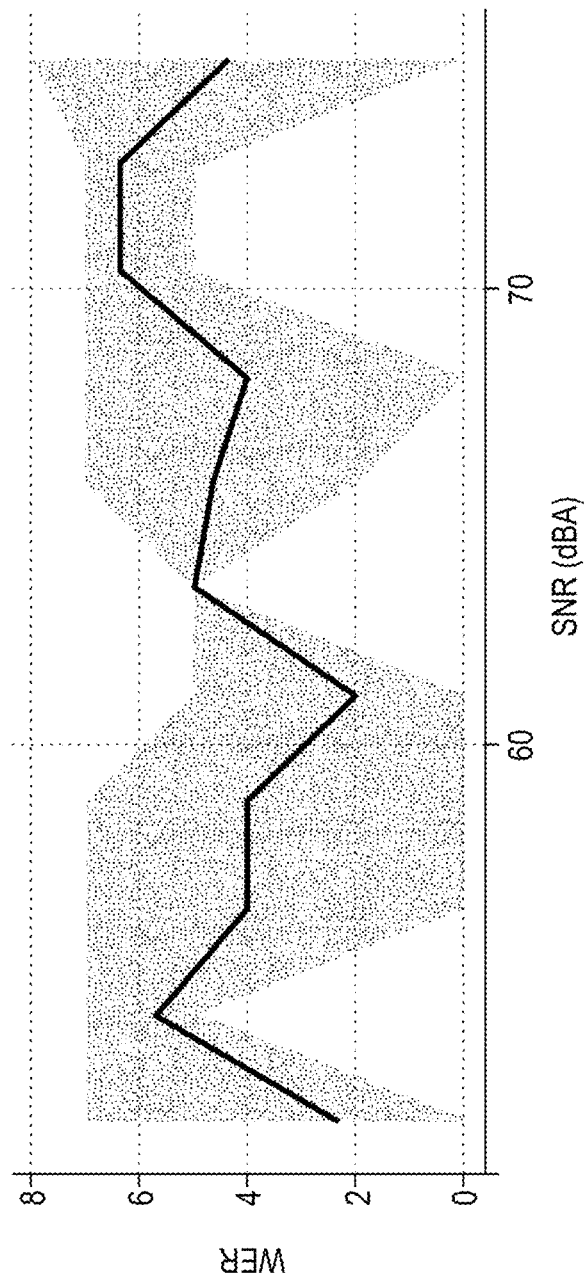
FIG. 5A is a graphical illustration of Word Error Rate (WER) using a Language Model (LM) decoder for over-the-air attacks.
Figure 5B:
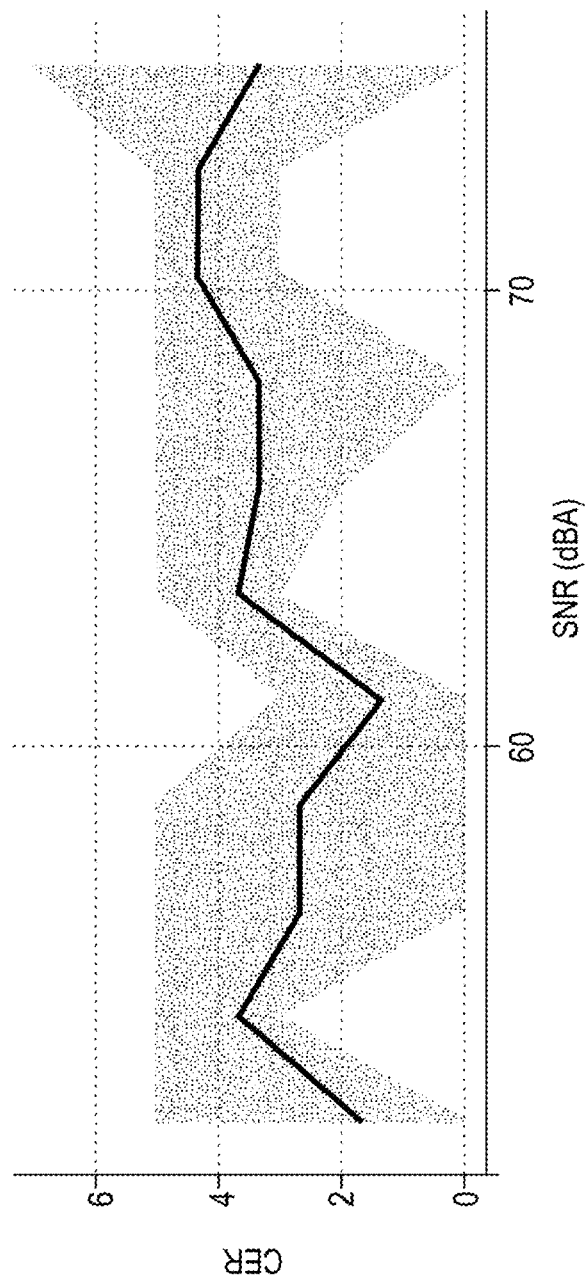
FIG. 5B is a graphical illustration of Character Error Rate (CER) using an LM decoder for over-the-air attacks.
Figure 5C:
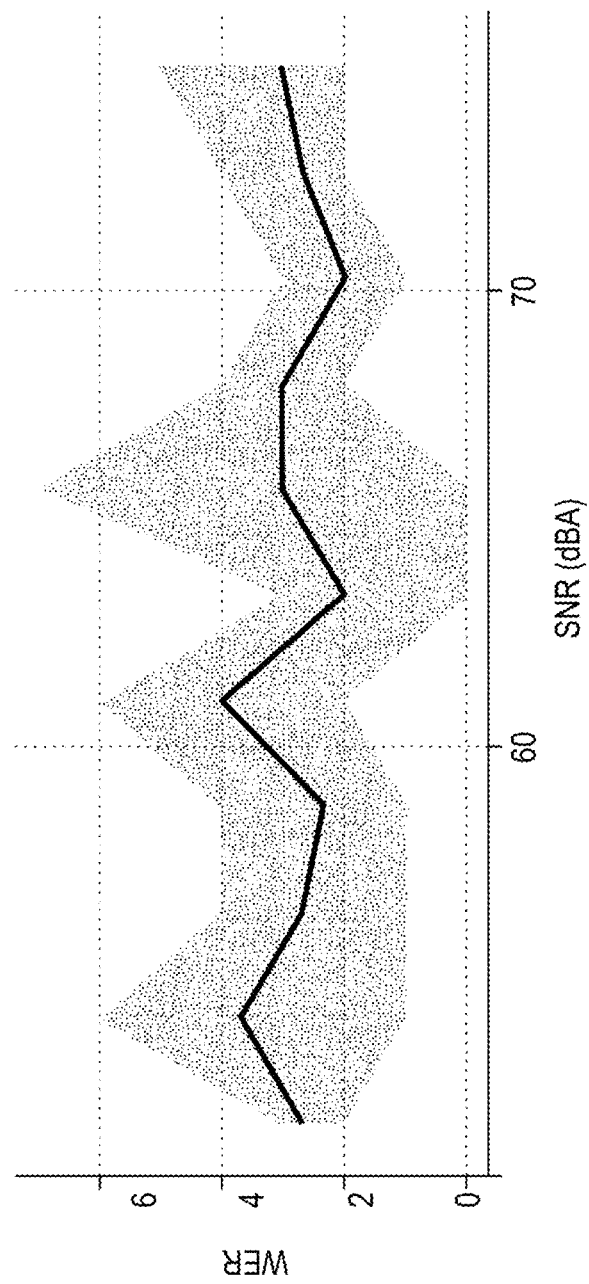
FIG. 5C is a graphical illustration of a WER using a greedy decoder for over-the-air attacks.

The effect of $\alpha$ can also be observed in the change of the spectrogram in FIG. 4A-4C. FIG. 4B shows the spectrogram when $\alpha=1$ so there is no constraint on where the adversary can attack. We see that the adversary is spread almost evenly around all frequency bands. In FIG. 4C, when $\alpha=0.5$, we see that the majority of the attack lies in these higher frequencies, especially when there is no speech present in the original signal which comes directly from the absolute threshold of hearing as shown in FIG. 2.

Over-the-Air Attacks

In one embodiment, the testing was extended to outside of the pure digital domain and perform over-the-air attacks (speaker/microphone combination). In order to improve the robustness of signals for over-the-air attacks, the signals are first passed through a room simulator much like the Expectation over Transform method. Note that instead of using prerecording room impulse responses as in, a more robust approach is taken as in, where a room simulator is used to generate responses with varying size and reflection coefficients for surfaces. A band-pass filter was also applied in the range $f=[100,7500]$ to eliminate any spurious low frequency components and account for the frequency drop-off that occurs near the Nyquist rate in digital recording hardware.

An Extech HD 6000 sound level meter was used to measure the loudness, using A-weighted decibels (dBA) which accounts for the sensitivity of human hearing, from the speaker to the microphone. The over-the-air tests were performed in an anechoic chamber with a noise floor of 36 dBA. The signals were broadcast using a Polk S20 speaker, Yamaha p2500s amplifier, and recorded using a MINI DSP UMIK-1 microphone.

The microphone was first positioned close to the speaker to ensure a high SNR and eliminate any path effects between the microphone and speaker. The distance between the microphone and speaker was then gradually increased, resulting in a lower SNR, to observe the effects of both added path effects and reduced signal power. A language model decoder, based on the Librispeech 4-gram ARPA, was also added to the end of the DeepSpeech model in parallel to the greedy decoder. The language model has the ability to error correct characters and words based on the speech corpus and, in some instances, can decrease the WER and CER rate.

FIGS. 5A-5D illustrates the WER and CER for the over-the-air attack using both a greedy and language model decoder. At a high SNR, the signal experiences clipping (the maximum amplitude of the signal is larger that the microphone response), which results in a high WER and CER (large string distance between y and $y_t$). Since the adversary is given as x+δ, it is shown that when clipping occurs on the positive rail, max{1,x+δ}, this will result in a truncation of the adversary and, in the extreme case, truncation of the original signal. The same will hold for the negative rail as well. As the distance increases and the SNR lowers, moving the x+δ away from the rails, the signal exhibits a lower WER and CER for both the language model (LM) and greedy decoder (G). Between 60 and 70 dBA, the language model decoder had a WER=4.0 and CER=2.4 while the greedy decoder had a WER=3.0 and CER=2.25.

TABLE 2

Average error rates for two speaker over-the-air attack

|  | WER | CER |
| --- | --- | --- |
| Language Model Decoder | 0.5 | 0.5 |
| Greedy Decoder | 5 | 4 |

In one embodiment, the over-the-air scenario extended to a two speaker setup which broadcasts the original audio and the adversary on two separate channels. The speakers were separated by a distance of 4 inches and the microphone was placed 6 inches from the speakers which resulted in a 40° separation between the speakers as observed from the microphone. The signal was measured with an average of 66.7 dBA at the microphone during broadcasting. Table 2 shows the average error rates over 4 trials for a language model and greedy decoder. The attack performs especially well using the language model decoder for the two speaker system, achieving a WER=0 and CER=0 for 3 of out the 4 trials.

In one or more embodiments, a method for generating white-box adversarial examples with psychoacoustic based constraints is disclosed. The adversaries are generated in an end-to-end fashion which relied on extracting relevant psychoacoustic information from the original audio signal. The optimization problem relied on an $l_2$-norm constraint in conjunction with the projected gradient descent method. The perceptual quality is based on the PESQ score, which eliminated the need for exhaustive listening tests. The adversarial examples typically lowered the SNR but, because of the psychoacoustic based constraints, the perceptual quality of the signal was increased resulting in a higher PESQ score. Finally, the attacks were shown to be effective in over-the-air broadcasting.

FIG. 6 is an illustration of audio adversarial attack environment 50 including speaker 52 and adversary 54. FIG. 6 illustrates an original audio message "turn off the television" 56 from speaker 52 and an audio message 58 from adversary 54. Original audio message 56 and audio message 58 combine to generate combined signal 60, thereby changing first output of automatic speech recognition (ASR) engine 62 between original audio message "turn off the television" 56 and a second output 64 of ASR engine 62 of combined signal 60 with an adversarial audio attack "Open the front door" 64.

The use of perceptual based adversarial audio attacks has applications in multiple fields including health care, vehicle systems, automation and security both for buildings and homes, and other voice activated services. The perceptual based adversarial audio attacks can be used to increase robustness an automated speech recognition system by injecting a signal which is unperceivable to the average human yet if others try to circumvent or otherwise attack the system, that additional signal can indicate an error. For example, in a hospital or health care setting, voice activated systems may be used to create prescriptions. The use of this perceptual based adversarial audio attack can be used to compliment the speakers natural voice thereby adding robustness. This also increases security that hinders other adversary attacks on the system. This may be implemented on a separate system from the automatic speech recognition system, for example, a computer may have an automated speech recognition system and of this may be a separate computer, a smart phone, or other computerized system.

The program code embodying the formulations, algorithms and/or methodologies described herein is capable of being individually or collectively distributed as a program product in a variety of different forms. The program code may be distributed using a computer readable storage medium having computer readable program instructions thereon for causing a processor (such as processor 102 of FIG. 7) to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to computer readable storage medium (such as computer readable storage medium 104 of FIG. 7) a computer (such as computer 100 of FIG. 7), another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments. While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A computer-implemented method for speech recognition, the method comprising:
   sampling an audio input signal to generate a time-domain sampled input signal;
   converting the time-domain sampled input signal to a frequency-domain input signal;
   generating perceptual weights in response to frequency components of critical bands of the frequency-domain input signal;
   creating a time-domain adversary signal in response to the perceptual weights; and
   combining the time-domain adversary signal with the audio input signal to create a combined audio signal, the time-domain adversary signal is a combination of a perceptual loss and an adversarial loss, and a speech processing of the combined audio signal outputs a different result from speech processing of the audio input signal.

2. The computer-implemented method of claim 1, wherein the combination of the perceptual loss and the adversarial loss is represented by an equation $$\min_{\|\delta\|_2 \leq \epsilon} \alpha L(x+\delta, y_{target}) + (1-\alpha)L_{percep}(\delta) \equiv \min_{\|\delta\|_2 \leq \epsilon} L_{tot}(x+\delta, y_{target}, \alpha),$$

where δ is a norm constraint.

3. The computer-implemented method of claim 2, wherein the norm constraint δ is an $l_2$ norm constraint and the combination of the perceptual loss and the adversarial loss is solved via a projected gradient descent (PGD) method.

4. The computer-implemented method of claim 1, wherein the time-domain sampled input signal is converted to the frequency-domain input signal via a symmetrical algorithm including a Fast Fourier Transform, a Discrete Fourier Transform, or a symmetrical filter bank.

5. The computer-implemented method of claim 1, wherein sampling the audio input signal is via an analog to digital A/D converter.

6. The computer-implemented method of claim 1 further comprising identifying the critical bands via a psychoacoustic model of a human ear.

7. The computer-implemented method of claim 6, wherein the psychoacoustic model is an MPEG psychoacoustic model or an AAC psychoacoustic model.

8. A non-transitory computer-readable medium tangibly embodying computer readable instructions for a software program, the software program being executable by a processor of a computing device to provide operations comprising:
   sampling an audio input signal to generate a time-domain sampled input signal;
   converting the time-domain sampled input signal to a frequency-domain input signal;
   generating perceptual weights in response to frequency components of critical bands of the frequency-domain input signal;
   creating a time-domain adversary signal in response to the perceptual weights; and
   combining the time-domain adversary signal with the audio input signal to create a combined audio signal, and the time-domain adversary signal is a combination of a perceptual loss and an adversarial loss.

9. The non-transitory computer-readable medium of claim 8, wherein the software program is executable by the processor of the computing device to provide a further operation of identifying the critical bands via a psychoacoustic model of a human ear.

10. The non-transitory computer-readable medium of claim 8, wherein the combination of the perceptual loss and the adversarial loss is represented by an equation $$\min_{\|\delta\|_2 \leq \epsilon} \alpha L(x+\delta, y_{target}) + (1-\alpha)L_{percep}(\delta) \equiv \min_{\|\delta\|_2 \leq \epsilon} L_{tot}(x+\delta, y_{target}, \alpha),$$

where δ is a norm constraint.

11. The non-transitory computer-readable medium of claim 10, wherein sampling the audio input signal is via an analog to digital A/D converter.

12. A computer system for performing adversarial audio attacks to an automated speech recognition system having a processor configured to execute computer-readable instructions and a memory configured to execute the computer-executable instructions, the computer-executable instructions when executed by the processor perform the following functions:
   sampling an audio input signal to generate a time-domain sampled input signal;
   converting the time-domain sampled input signal to a frequency-domain input signal;
   identifying critical bands via a psychoacoustic model of a human ear;
   generating perceptual weights based on frequency components of the critical bands of the frequency-domain input signal;
   creating a time-domain adversary signal based on the perceptual weights; and
   combining the time-domain adversary signal with the audio input signal to create a combined audio signal, and the time-domain adversary signal is a combination of a perceptual loss and an adversarial loss.

13. The computer system of claim 12, wherein the combination of the perceptual loss and the adversarial loss is represented by an equation $$\min_{\|\delta\|_2 \leq \epsilon} \alpha L(x+\delta, y_{target}) + (1-\alpha)L_{percep}(\delta) \equiv \min_{\|\delta\|_2 \leq \epsilon} L_{tot}(x+\delta, y_{target}, \alpha),$$

where δ is a norm constraint.

14. The computer system of claim 13, wherein sampling the audio input signal is via an analog to digital A/D converter.

15. The computer system of claim 12, wherein the psychoacoustic model is an MPEG psychoacoustic model or an AAC psychoacoustic model.

16. The computer system of claim 12, wherein a speech processing of the combined audio signal outputs a different result from speech processing of the audio input signal.

17. The non-transitory computer-readable medium of claim 9, wherein the psychoacoustic model is an MPEG psychoacoustic model or an AAC psychoacoustic model.

18. The non-transitory computer-readable medium of claim 10, wherein the norm constraint δ is an $l_2$ norm constraint and the combination of the perceptual loss and the adversarial loss is solved via a projected gradient descent (PGD) method.

19. The computer system of claim 13, wherein the norm constraint $\delta$ is an $l_2$ norm constraint and the combination of the perceptual loss and the adversarial loss is solved via a projected gradient descent (PGD) method.

* * * * *